Dec. 29, 1936. R. G. THOMPSON 2,065,629
TYPEWRITING MACHINE
Filed July 23, 1934 2 Sheets-Sheet 1

INVENTOR
Russell G. Thompson
BY Harold E. Stonebraker,
ATTORNEY

Dec. 29, 1936.  R. G. THOMPSON  2,065,629
TYPEWRITING MACHINE
Filed July 23, 1934   2 Sheets-Sheet 2
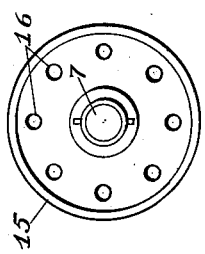
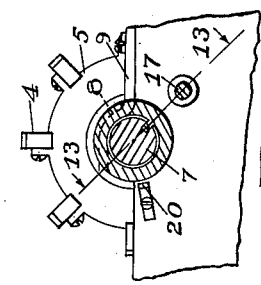
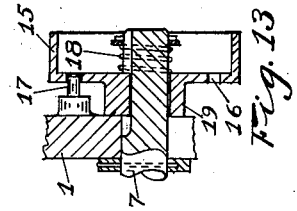
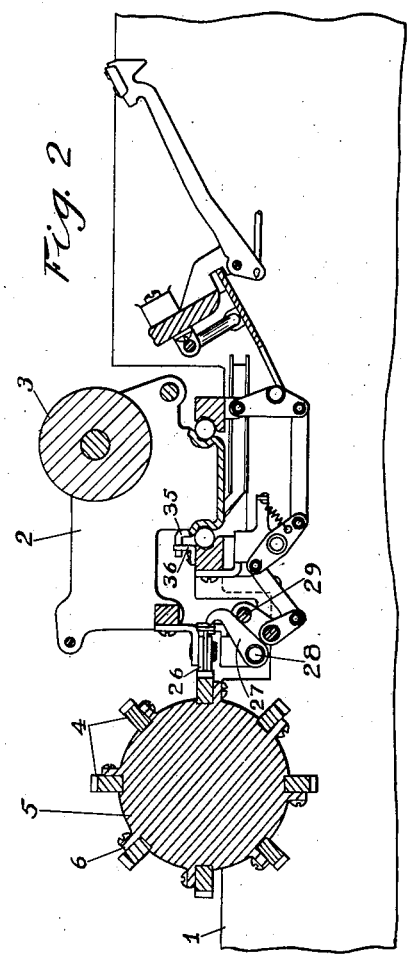
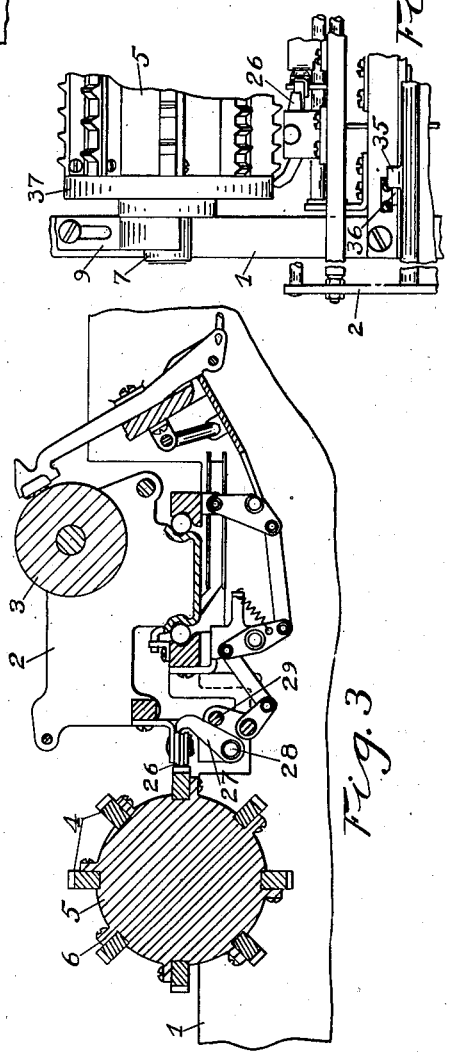
INVENTOR
Russell G. Thompson
BY Harold E. Stonebraker
ATTORNEY Patented Dec. 29, 1936

2,065,629

UNITED STATES PATENT OFFICE 2,065,629

TYPEWRITING MACHINE

Russell G. Thompson, Rochester, N. Y., assignor to Underwood Elliott Fisher Company, a corporation of Delaware Application July 23, 1934, Serial No. 736,464

10 Claims. (Cl. 197—84)

My invention relates to a typewriting machine, and has for its object to afford a practical, simple, and efficient mechanism for justifying the lines of typewritten material.

More particularly, the invention has for its purpose to afford mechanism in which an escapement pawl is mounted on a traveling carriage, the pawl cooperating with a relatively stationary escapement rack which is selectable from a number of escapement racks so as to make it possible to vary the length of line and also the number of characters in a given line.

An additional purpose of the invention is to afford a simply constructed and practical escapement rack holder which is removably positionable on the frame of the machine to vary the length of line, and is adjustable to select any rack of those on the particular holder and thus vary the number of characters to a given line.

To these and other ends, the invention consists in the construction and arrangement of parts that will appear clearly from the following description when read in conjunction with the accompanying drawings, the novel features being pointed out in the claims following the specification.

In the drawings:

Fig. 2 is a transverse vertical sectional view showing the normal position of parts;

Fig. 3 is a view similar to Fig. 2 showing the position of the parts as a type bar engages the platen;

Fig. 10 is a partial plan view showing the position of the escapement pawls and carriage when the latter reaches the limit of its movement;

Fig. 11 is an end view of the escapement rack adjusting handle;

Fig. 12 is a sectional view on line 12—12 of Fig. 1, and

Fig. 13 is a sectional view on line 13—13 of Fig. 12.

Figure 1:
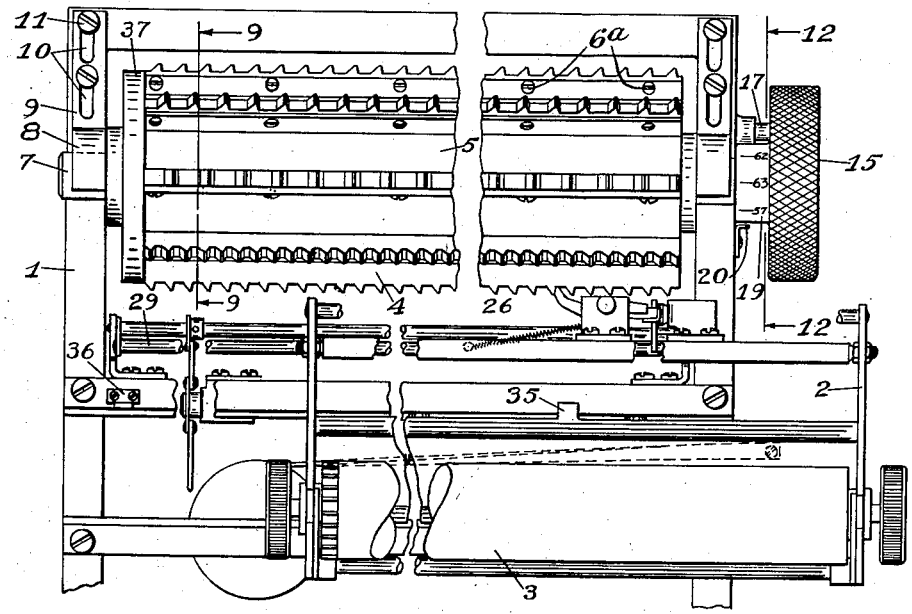
Fig. 1 is a partial plan view of a typewriting machine showing the application of one embodiment of the invention.

Referring more particularly to the drawings, in which like reference characters refer to the same parts throughout the several views, 1 designates generally the frame of the machine and 2 is the carriage provided with the platen 3 and movable on suitable tracks and bearings mounted on the frame, as usual in typewriter constructions.

The carriage has mounted thereon an escapement controlling mechanism comprising in the present instance a pair of pawls which govern the movement of the carriage by cooperating, as each type bar is actuated, with an escapement rack that is stationary during the operation of the carriage, and the construction and disposition of the escapement rack holder will now be described.

In the illustrated embodiment, which is intended as one example of different practical adaptations of the invention, a series of racks 4 are suitably attached to a holder that is both removable and adjustable. In the present instance, the holder comprises a cylinder 5 having flanges 6 extending radially therefrom and to which the individual racks are demountably secured by suitable attaching means 6ª, the racks preferably resting in grooves or recesses extending endwise of the cylinder.

The holder or cylinder is provided with eight racks which are all of the same length, each having a different number of teeth, with the result that the holder can be adjusted by turning it to afford different numbers of characters to a line in accord with the number of teeth in each particular rack. Preferably all the racks on a single holder are of the same length, so that the racks on each holder produce a line of the same length, and where it is desirable to change the length of line, the rack holder is removed from the machine and another one positioned, and adjusted as desired. Thus it is possible in a single machine to have different lengths of lines and different numbers of characters to the line.

To accomplish this purpose, the cylindrical holder 5 has trunnions 7 which rest in bearings in the frame and are held in place by the curved arms 8, mounted on or formed as parts of slides 9, the latter being slotted at 10 for cooperation with stops 11 and slidable rearwardly when the rack holder is to be removed and another substituted for changing the length of line. The arms 8 and slides 9 are held in the position shown in Figs. 1 and 12 by frictional engagement with the stops 11, and the rack holder is thus maintained in operative relation on the frame and can in such position be adjusted to select any particular rack of the series in the following manner.

Referring to Figs. 1 and 13, the trunnion 7 at one end of the cylinder has slidably keyed thereon a handle or knob 15 provided with a series of openings 16 that cooperate selectively with a locking pin 17 on the frame. 18 is a spring which holds the handle 15 and likewise the rack holder in any selected position. When it is desired to change the particular rack and to adjust the holder to select another rack of the same line length, but with a different number of characters, the handle or knob 15 is pulled endwise against the action of spring 18 until the opening 16 is out of engagement with the pin 17, and the handle and rack holder can then be turned to bring any desired rack into operative position.

When the handle is released, the pin 17 engages another one of the openings 16, dependent upon the position of the holder and retains the latter in adjusted position. The operator is advised of the position of the rack holder and the particular rack selected by suitable indicating data upon the collar 19 of the handle with which cooperates a pointer or indicator 20, the data on the collar 19 indicating the number of characters to the line of the different racks on the holder.

Thus with the arrangement illustrated, eight independent escapement racks afford eight separate numbers of characters to a line of the same length, and it will be understood that if a different length line of writing is desired, the escapement rack holder is removed and another holder positioned on the frame with racks of a different length.

The carriage is propelled by the usual tape and spring motor as the keys of the typewriter are operated, such movement of the carriage being controlled by the escapement pawls 25 and 26 which cooperate with the selected escapement rack in a manner that will appear presently, and are actuated by a lever 27 secured to the rock shaft 28 which is mounted on the carriage. Said lever 27 is engaged and operated as each type bar is actuated by the universal bar 29 that is arranged to be operated by the type action and to move from the position shown in Fig. 2 to that shown in Fig. 3 as each type bar is operated. When the lever 27 is moved forwardly from the position shown in Fig. 2 to that shown in Fig. 3 by the universal bar, it permits the carriage to move the distance of one tooth on the rack, the successive positions of the escapement pawls for accomplishing this end being illustrated in Figs. 4 to 7.

Located between the pawls 25 and 26 is a spacing and operating plate 31 having a flange 32 that engages the tail of pawl 26 and a flange 33 of greater thickness than flange 32 and which engages the tail of pawl 25. The pawls and spacing plate 31 are mounted on a pivot pin 34, the pawls being held in normal position by the springs 35ª and the spacing plate by the spring 36ª.

Figure 4:
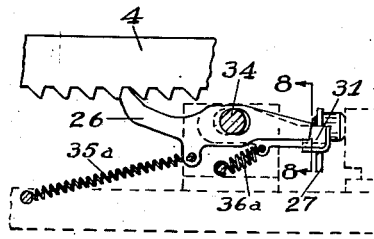
Fig. 4 is an enlarged detail plan view showing a portion of the selected escapement rack and the escapement pawls in their normal position of engagement when holding the carriage.
Figure 5:
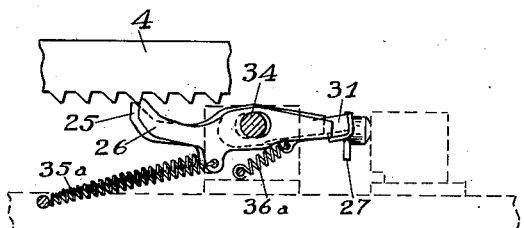
Fig. 5 is a view similar to Fig. 4 showing the initial movement of the pawls during operation of a type bar.
Figure 6:
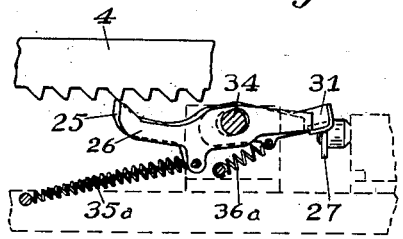
Fig. 6 is a similar view showing the next position of the escapement pawls during the movement of a type bar.
Figure 7:
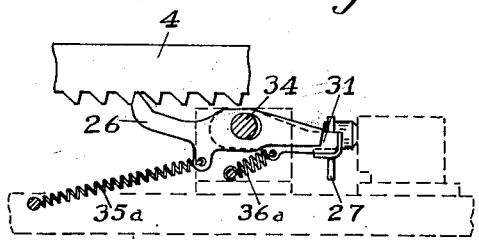
Fig. 7 is a similar view showing the final position of the pawls in engagement with the next succeeding tooth of the escapement rack, after the carriage has moved through the distance of one tooth on the rack.
Figure 9:
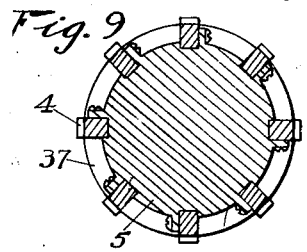
Fig. 9 is a sectional view on line 9—9 of Fig. 1.
Figure 8:
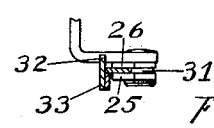
Fig. 8 is a sectional view on line 8—8 of Fig. 4.

When the lever 27 previously described is operated and moved from the position shown in Fig. 4 to that shown in Fig. 5 by the operation of a type bar, it moves the spacing and operating plate 31 laterally and the flange 33 first engages the tail of the pawl 25 and disengages it from the rack tooth. Subsequently the flange 32 engages the tail of pawl 26 and disengages it as shown in Fig. 6. Thus pawl 25 is disengaged from the rack tooth slightly in advance of pawl 26 so that by the time pawl 26 is disengaged, as shown in Fig. 6, by the extreme movement of the lever 27 and the operating and spacing plate 31, pawl 25 is already in position to engage the next adjacent tooth of the rack, and when released, the two pawls then assume the final position shown in Fig. 7 and the parts are ready for a repetition of the operation.

It is essential to provide means for disengaging the escapement pawls from the rack while the rack holder is adjusted for selecting a different controlling rack, and this may be accomplished in a variety of ways. In the construction shown, when the carriage reaches the extreme limit of its movement to the left, a lug 35 on the carriage engages a stop 36, see Figs. 1 and 10, thus limiting the movement of the carriage in such direction.

When the carriage reaches this point, the pawls have passed beyond the rack, as shown in Fig. 10, and engage an annular surface 37 at one end of the rack holder. The rack holder may be adjusted while the carriage is in this position, and the escapement pawls will ride on the annular surface 37 as it is turned. When the selected rack has been positioned and the rack holder again locked in position, the carriage can be brought back to its initial writing position, the pawls riding over the rack for this purpose.

While the invention has been described with reference to the structural embodiments shown, it is not confined to the details herein disclosed, and this application is intended to cover any modifications or departures coming within the purposes of the improvement or the scope of the following claims.

I claim:

1. In a typewriting machine, the combination with a frame, a carriage movable thereon, and key-levers actuating individual type-carriers, of an escapement rack mounted on the frame and in stationary relation to the carriage when the latter is operating, an escapement pawl-device mounted on the carriage and movable relatively thereto for co-operating with said rack to letter-feed the carriage, a type-action member traversed by said carriage, and means enabling said type-action member to engage and actuate said pawl-device in any position of the carriage.

2. In a typewriting machine, the combination with a frame and a carriage movable thereon, of a holder rotatably mounted on the frame, independent escapement racks demountably supported on the holder, means for adjusting said holder to bring any selected rack into operative relation with the carriage, said rack being stationary when the carriage is operating, an escapement pawl-device mounted on the carriage and co-operating with said selected rack, and holder-retaining means adapted for quickly releasing the holder to permit its removal preparatory to quick substitution of another holder having racks different from said first racks.

3. In a typewriting machine, the combination with a frame and a carriage movable thereon, of a holder rotatively mounted adjacent to the carriage, independent escapement racks supported on the holder, means for rotatively adjusting said holder to bring any selected rack into operative relation with the carriage, said rack being stationary when the carriage is operating, an escapement pawl-device mounted on the carriage and movable relatively thereto for co-operating with said selected rack to letter-feed the carriage, a type-action member traversed by said carriage, and means enabling said type-action member to engage and actuate said pawl-device in any position of the carriage.

4. In a typewriting machine, the combination with a frame and a carriage movable thereon, of a plurality of escapement racks mounted adjacent the carriage and adapted to be brought selectively into operative relation with the carriage, an escapement pawl-device mounted on the carriage and movable relatively thereto for co-operating with the selected rack, a type-action member traversed by said carriage, and means enabling said type-action member to engage and actuate said pawl-device in any position of the carriage.

5. In a typewriting machine, the combination with a frame, a carriage movable thereon, and printing instrumentalities traversed by said carriage, of a holder mounted adjacent to the carriage, independent escapement racks supported on the holder, means for adjusting said holder to bring any selected rack into operative relationship with the carriage, an escapement pawl-device mounted on the carriage and movable relatively thereto for co-operating with said selected rack, and a universal member traversed by said carriage and operative in any carriage-position for actuating said pawl-device, said universal member being operatively connected to said printing instrumentalities for actuation by the latter to letter-feed the carriage.

6. In a typewriting machine, the combination with a frame, a platen-carriage movable thereon, and printing instrumentalities traversed by said platen-carriage, of a holder mounted adjacent the carriage, independent escapement racks supported on the holder, means for adjusting the holder to bring any selected rack into operative relation with the carriage, an escapement pawl-device mounted on the carriage and movable relatively thereto for co-operating with said selected rack, a universal member traversed by said carriage and operative in any carriage-position for actuating said pawl-device, and a second universal member operable by said printing instrumentalities and connected to the pawl-device universal member for actuating the latter to letter-feed the carriage.

7. In a typewriting machine, the combination with a frame and a carriage movable thereon, of a holder rotatively mounted on the frame, independent escapement racks supported on the holder, means for rotatively adjusting the holder to bring any selected rack into operative relation with the carriage, an escapement pawl mounted on the carriage and cooperating with said selected rack, and means operating to hold the pawl disengaged from the rack when the holder is turned to select a rack.

8. In a typewriting machine, the combination with a frame and a carriage movable thereon, of a holder rotatively mounted on the frame, independent escapement racks supported on the holder, means for rotatively adjusting the holder to bring any selected rack into operative relation with the carriage, an escapement pawl mounted on the carriage and cooperating with said selected rack, and an annular pawl-engaging portion at one end of the holder with which said pawl engages when the holder is turned to select a rack.

9. In a typewriting machine, the combination with a frame and a carriage movable thereon, of a holder adjustably mounted on the frame, independent escapement racks secured to the holder, means for adjusting the holder to select any rack and bring it into operative relation with the carriage, an escapement pawl mounted on the carriage and cooperating with the selected rack, and means operating to hold the pawl disengaged from the rack during adjustment of the holder.

10. In a typewriting machine, the combination with a frame and a carriage movable thereon, of a holder adjustably mounted on the frame, independent escapement racks carried by the holder, means for adjusting the holder to place any selected rack in operative relation with the carriage, an escapement pawl-device mounted on the carriage and movable relatively thereto for cooperating with the selected rack, and printing instrumentalities mounted in said frame and traversed by said carriage, means being provided whereby said printing instrumentalities engage and actuate said pawl-device to letter-feed the carriage.

RUSSELL G. THOMPSON.